UNITED STATES PATENT OFFICE.

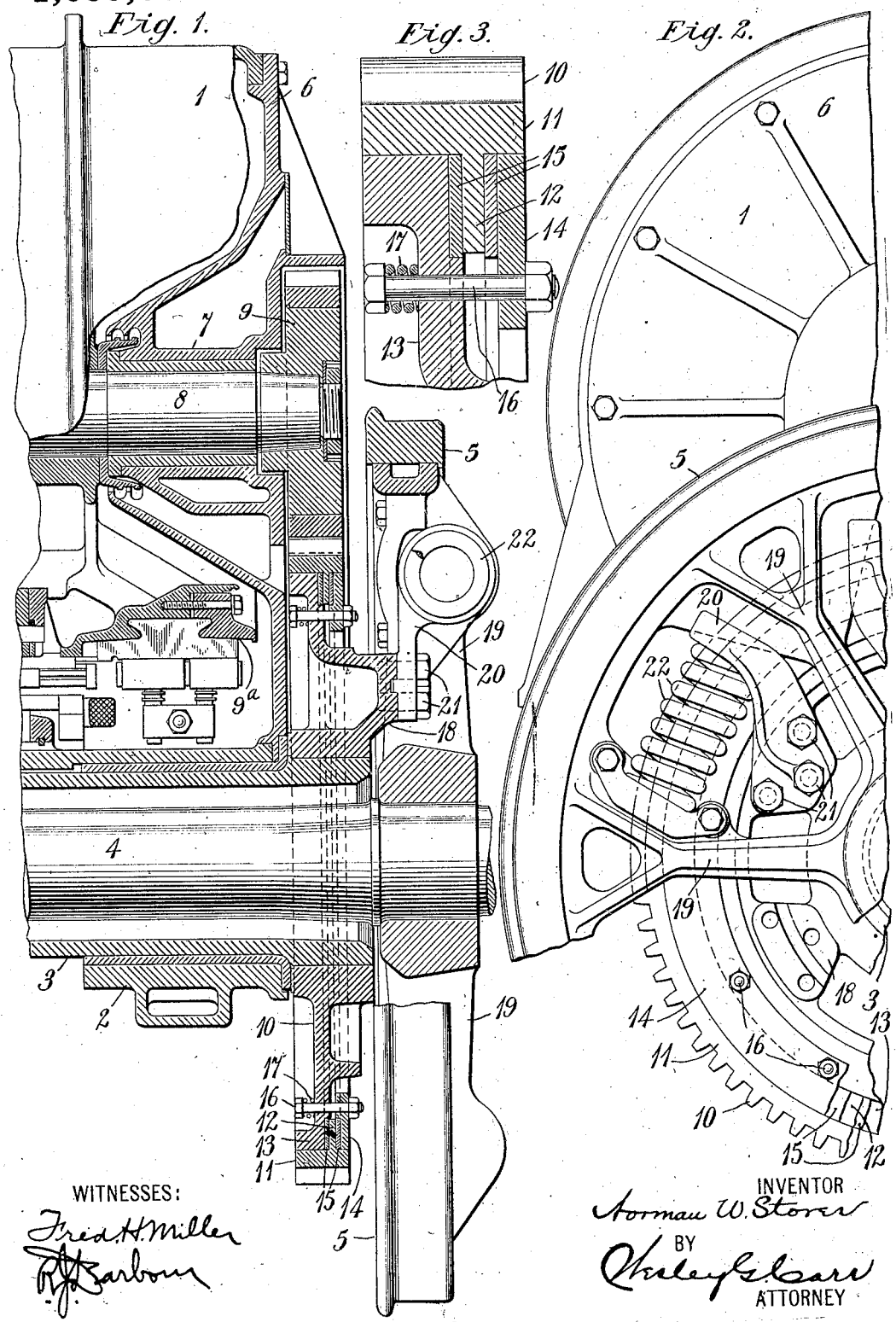

NORMAN W. STORER, OF PITTSBURGH, PENNSYLVANIA, ASSIGNOR TO WESTINGHOUSE ELECTRIC AND MANUFACTURING COMPANY, A CORPORATION OF PENNSYLVANIA.

DRIVING CONNECTION FOR ELECTRIC LOCOMOTIVES.

1,059,008.  Specification of Letters Patent.  Patented Apr. 15, 1913.

Application filed September 18, 1911. Serial No. 649,980.

*To all whom it may concern:*

Be it known that I, NORMAN W. STORER, a citizen of the United States, and a resident of Pittsburgh, in the county of Allegheny and State of Pennsylvania, have invented a new and useful Improvement in Driving Connections for Electric Locomotives, of which the following is a specification.

My invention relates to electric locomotives and other railway vehicles and it has for its object to provide an improved driving connection between the electric motors and the driving wheels of the vehicle.

In Patent No. 993,568, granted May 30, 1911, and assigned to the Westinghouse Electric & Manufacturing Company, upon an application filed by me, is illustrated and described a resilient connection between an electric motor and the truck wheels or drivers of an electric locomotive or car that is specially adapted for use with very large motors which are connected by reducing gearing located at the respective ends of the motor. In my present invention, it is my aim to provide a drive of the same general character that shall possess all of the advantages which pertain to the device of my previous patent and the additional advantage of avoiding vibration, as hereinafter explained, and relieving the main driving springs and the spring connections from strains to which they are constantly subjected in service, as, for example, when the locomotive or car is started under adverse conditions.

In carrying out my invention, I utilize a clutch connection between the driving rim and the driving hub of the main gears which is so designed and set as to permit relative rotation between the two parts when the load exceeds a predetermined amount.

Figure 1 of the accompanying drawings is a sectional elevation of a portion of an electric locomotive embodying the driving connection of my invention. Fig. 2 is an end view of the parts shown in Fig. 1, and Fig. 3 is a sectional view, on a larger scale, of the gear clutch of the other figures.

Referring to the drawings, the stator 1 of an electric motor is provided with bearings 2 in which a sleeve or quill 3 is rotatively supported. A driving axle 4 of a truck or locomotive extends loosely through the sleeve or quill 3 and is provided with driving wheels 5, in the usual manner. The stator 1 of the electric motor is provided with end frames 6 having bearings 7 in which the motor shaft 8, on which the motor armature 9ᵃ is mounted, is rotatively supported. Pinions 9 are located at the respective ends of the motor shaft and mesh with gear wheels 10, which are mounted on the ends of the sleeves or quill 3.

As shown in Fig. 3, the gear wheels 10 comprise rim members 11, each having an inwardly extending annular projection 12 which forms one member of a driving clutch, the opposing parts of which are constituted by the hub member 13 of the gear and a ring 14 between which the projection 12 is secured. The ring 14 and the opposite surface of the hub member 13 are lined with leather or other suitable material in the form of rings 15. The ring 14 is clamped in position by a plurality of bolts 16 which act through springs 17 to draw the members 13 and 14 toward each other to firmly grip the projection 12 of the member 11.

The hub member 13 is provided with a series of projections 18 which extend between the spokes 19 of the wheel 5 and to which radial driving arms 20 are secured by bolts 21. Helical springs 22 are interposed between the outer ends of the radial driving arms 20 and the spokes 19.

Resilient driving connections of the general class above described show a tendency to vibrate or oscillate with increasing amplitude when the wheels slip, thus causing the springs to be completely compressed and a heavy blow to be delivered to the wheel spokes by the radial driving arms. One of the principal advantages of my present invention lies in the fact that the clutch, when properly adjusted, slips before the maximum strains are imposed on the springs and before the arms strike. In other words, the clutch tends to damp out or prevent the vibration above referred to and to materially change the character and operation of the entire driving connection.

In order to produce the aforesaid results to the best advantage, the clutch member should be located in the driving connections as close to the driving springs as possible.

While I have shown only one end of the motor and the wheel axle which I have described, both ends will be substantially alike, as far as the driving connections are concerned.

The structural details of the driving connection illustrated may be varied within the spirit and scope of my invention.

I claim as my invention:

1. A driving connection for railway vehicles comprising wheels and an axle therefor, a sleeve or quill surrounding the axle, gear hub members secured to the respective ends of the sleeve or quill, interposed springs between the wheel spokes and the gear hub members, gear rim members, friction clutch connected to the gear hub members, and motor-driven pinions meshing with the gear rims.

2. A driving connection for railway vehicles comprising wheels and an axle therefor, a sleeve or quill surrounding the axle, gear hub members secured to the respective ends of the sleeve or quill, yielding connections between the wheel spokes and the gear hub members, gear rim members friction clutch connected to the gear hub members, and motor-driven pinions meshing with the gear rims.

3. A driving connection for electric railway vehicles comprising wheels and an axle therefor, a sleeve or quill surrounding the axle, gear hub members secured to the respective ends of the sleeve or quill and having projections which extend outwardly between the spokes of the wheels, radial arms secured to the projections, springs interposed between the ends of the arms and the wheel spokes, gear rim members mounted on the gear hub members and connected thereto by friction clutch connections, and an electric driving motor having a rotatable armature, a shaft and pinions mounted on the respective ends of the motor shaft and meshing with the gear rim members.

4. A driving connection for railway vehicles comprising a driving motor, wheels and an axle therefor, a sleeve or quill surrounding the axle, friction clutches having driven members secured to the ends of the sleeve or quill and yieldingly connected to the wheels, and driving members operatively connected to the motor.

In testimony whereof, I have hereunto subscribed my name this 12th day of September, 1911.

NORMAN W. STORER.

Witnesses:
JOHN L. CROUSE,
B. B. HINES.